United States Patent
Kuenzner

(10) Patent No.: US 8,731,772 B2
(45) Date of Patent: May 20, 2014

(54) DIALOGUE SYSTEM FOR A MOTOR VEHICLE

(75) Inventor: Hermann Kuenzner, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 609 days.

(21) Appl. No.: 12/763,531

(22) Filed: Apr. 20, 2010

(65) Prior Publication Data

US 2010/0204915 A1 Aug. 12, 2010

Related U.S. Application Data

(63) Continuation of application No. PCT/EP2008/008746, filed on Oct. 16, 2008.

(30) Foreign Application Priority Data

Oct. 25, 2007 (DE) .......................... 10 2007 051 015

(51) Int. Cl.
*B60R 16/00* (2006.01)

(52) U.S. Cl.
USPC .......... 701/36; 340/438; 340/501; 340/539.1; 345/184; 345/156

(58) Field of Classification Search
USPC ......... 340/425, 709, 706, 711, 712, 602, 710, 340/723, 184, 156, 164–165, 902; 345/184, 345/156, 164–165, 902, 425, 709, 706, 711, 345/712, 602, 710, 723
See application file for complete search history.

(56) References Cited

U.S. PATENT DOCUMENTS

| | | | | |
|---|---|---|---|---|
| 5,977,964 A | * | 11/1999 | Williams et al. | 715/721 |
| 2002/0149704 A1 | | 10/2002 | Kano et al. | |
| 2006/0080032 A1 | | 4/2006 | Cooper et al. | |
| 2006/0111140 A1 | * | 5/2006 | Wang et al. | 455/552.1 |
| 2007/0242050 A1 | * | 10/2007 | Kuenzner et al. | 345/172 |

FOREIGN PATENT DOCUMENTS

| | | | |
|---|---|---|---|
| DE | 196 41 493 A1 | | 4/1998 |
| DE | 10 2004 058 954 A1 | | 6/2006 |
| EP | 1 026 041 A2 | | 8/2000 |
| EP | 1026041 A2 | * | 8/2000 |
| EP | 1 635 144 A1 | | 3/2006 |
| WO | WO 97/47135 A1 | | 12/1997 |

OTHER PUBLICATIONS

International Search Report dated Jan. 28, 2009 including English-language translation (Six (6) pages).
German Search Report dated Dec. 5, 2011 (Six (6) pages).
Volkswagen AG: RNS 300 Navigation System. Manual Golf Variant, Jetta. Wolfsburg: Volkswagen AG, 11:2006. pp. 9-10. -ISBN Art.-NR.:272.552.RNS.00.

* cited by examiner

*Primary Examiner* — Adam Tissot
(74) *Attorney, Agent, or Firm* — Crowell & Moring LLP

(57) ABSTRACT

In a dialogue system for a motor vehicle, the dialogue system including a plurality of control keys, assigning at least one of at least on of the control keys a function from a predefined set of functions in such a manner that the function is executed upon actuation of the control key. The control key can be assigned a primary parameter, which is automatically required for executing the function, and at least one secondary parameter which relates to the method for executing the function, in such a manner that the function is executed in the manner defined by the secondary parameter upon actuation of the control key.

16 Claims, 2 Drawing Sheets

DIALOGUE SYSTEM FOR A MOTOR VEHICLE

CROSS-REFERENCE TO RELATED APPLICATIONS

This application is a continuation of PCT International Application No. PCT/EP2008/008746, filed Oct. 16, 2008, which claims priority under 35 U.S.C. §119 from German Patent Application No. DE 10 2007 051 015.4, filed Oct. 25, 2007, the entire disclosures of which are herein expressly incorporated by reference.

This application contains subject matter related to U.S. application Ser. No. 12/763,496, entitled "Dialogue System," filed on even date herewith.

BACKGROUND AND SUMMARY OF THE INVENTION

The invention relates to a dialogue system for a motor vehicle. The dialogue system includes a plurality of control keys, at least one of which can be assigned a function from a predefined set of functions in such a manner to execute the function upon actuation of the control key.

The term "dialogue system" as used herein is equivalent to a multifunctional operating device for motor vehicles including a menu, video screen, and one or more operator controls.

A dialogue system of the above-mentioned type is known, for example, from DE 10 2004 058 954 A1. The control keys of a dialogue system can usually be assigned variables, such as navigation destinations, telephone numbers, radio transmitters and/or audio sources. These particular assignment variables (e.g., navigation destinations, telephone numbers and/or radio transmitters) can represent a parameter of a function that is to be executed. For example, when a control key assigned to a navigation destination is actuated, a route guidance (e.g., function) to the navigation destination (e.g., parameter) is supposed to be initiated.

Depending on the technical implementation, a control key can be assigned only the parameter, and the suitable function is determined by means of the category of the parameter when the control key (for example, route guidance in the case of a navigation destination) is actuated or both the function and the parameter are assigned to the control key. Moreover, dialogue systems, in which a control key is assigned only one such parameter by means of information technology must be included in the aforementioned genre, insofar as owing to the category of the parameter they are effectively also assigned a function that is suitable for utilizing said parameter.

It is an object of the invention to provide a dialogue system that further enhances the operator control convenience that can be achieved through the unrestrained assignment of control keys.

This object is realized with a dialogue system including a plurality of control keys wherein a function from a predefined set of functions may be assigned to at least one control key, the control key configured for dialogue system for a motor vehicle. The function may then be executed upon actuation of the control key. The dialogues system includes a processor coupled to the plurality of control keys. The processor may be configured to assign the control key a primary parameter, which is automatically required for executing the function. The processor may further assign at least one secondary parameter, which relates to the method for executing the function, and execute the function in the manner defined by the secondary parameter upon actuation of the control key.

Advantageous embodiments and further developments of the invention are apparent as described herein.

According to the invention, the control key is assigned a primary parameter which is essential for the execution of a function and at least one secondary parameter that defines a method for executing a function. By way of example, the function may relate to one or more of a navigation destination for route guidance, telephone number for a call, URL for Internet calling, radio stations for a radio reproduction, and source information for a source selection.

In this way, the operator can define the manner in which the function shall be executed when the function is called with the primary parameter by means of the control key.

One embodiment of the invention is based on the idea that the operator's preferred method for executing a function is often highly dependent on the respective primary parameter. In particular, operator preferences can relate to a manner of sound reproduction. However, operator preferences can also relate to a viewing mode of a screen. Providing for the assignment of secondary parameters with respect to these two main points of a function execution, either separately or in combination, is considered especially advantageous.

Assigning at least one secondary parameter to the control key eliminates the need for the operator to set an appropriate, correct, and/or desired method for executing the function, either before or after initiating the respective function by actuating the control key by means of tedious setting processes.

The invention is especially advantageous if the secondary parameter relates to a continuously, or quasi-continuously, definable setting parameter, such as a sound level. In conventional systems, a definable setting parameter is typically defined in an iterative manner over a prolonged period of time. In contrast, the invention offers an operator the possibility of preserving a setting of the secondary parameter, which after protracted attempts the operator finally deems to be suitable in combination with a certain primary parameter by assigning this setting to the respective control key in precisely this context.

According to a preferred embodiment of the invention, the at least one secondary parameter relates to the manner of a sound reproduction. This feature is especially advantageous if the primary parameter relates to a radio station or an audio source.

For example, many users generally prefer to play music from radio stations softly, whereas they prefer to play self-selected music CDs loudly. For such users it is advantageous to assign a low sound level as the secondary parameter to a control key, to which the primary parameter "audio source radio" is assigned, and/or to assign a high sound level as the secondary parameter to a control key, which is assigned the primary parameter "audio source CD." Furthermore, many users like to listen to radio stations that broadcast predominantly news at a uniform sound level adjustment, whereas they like to listen to radio stations, which broadcast predominantly music, at accentuated bass levels. For such users it is advantageous to assign a uniform sound distribution as the secondary parameter to a control key, which is assigned a first (e.g., news loaded) radio station as the primary parameter. Similarly, these users can assign a sound distribution with accentuated bass levels as the secondary parameter to a control key, which is assigned a second (e.g., music loaded) radio station as the primary parameter. Furthermore, it is also advantageous to assign a certain sound level and/or sound distribution as the secondary parameter to a telephone number, if it is known from experience that the subscriber to be called speaks very loudly, softly, or is otherwise very difficult to understand.

According to a preferred embodiment of the invention, the at least one secondary parameter relates to the viewing mode of a screen, for example, the orientation (pointing in the direction of travel or pointing north) and/or the scale of a map view. This feature is especially advantageous, when the primary parameter relates to a navigation destination. In the case of a route guidance to specific destinations, for instance, when these destinations are located in an urban area, many users prefer a small map scale. On the other hand, in the case of the route guidance to other destinations, for instance, when these destinations are located outside urban areas, a large map scale is preferred. For such users it is advantageous to assign a small map scale as the secondary parameter to a control key, which is assigned a first navigation destination as the primary parameter, and/or to assign a large map scale as the secondary parameter to a control key, which is assigned a second navigation destination as the primary parameter. Furthermore, the screen view mode can also relate to the screen content. For example, it is advantageous to assign to a telephone number specific screen content as the secondary parameter, for example, a display of the incurred call charges, if experience has shown that conversations with the subscriber to be called incur high call charges. According to another especially preferred embodiment of the invention, the primary parameter is an Internet address and the secondary parameter is a script size for the display of the contents available at this Internet address.

According to an additionally preferred embodiment of the invention, the primary parameter is a navigation destination, and the secondary parameter is a criterion of the route planning for the route guidance to this navigation destination, for example, a fast or short route.

According to another preferred embodiment of the invention, the primary parameter is an Internet address, and the secondary parameter is script size for the display of the content available at this Internet address.

The invention can advantageously allow for configuring the dialogue system in such a way that the current assignment of the control key can be indicated in response to an operator request. Hence, the operator can be informed by the request operation as to the resulting consequence of actuating the control key.

The request operation can include, for example, softly touching the control key, gently tapping the control key, motion of the operator's hand near the control key, and in some instances gentle tapping and motion of the operator if the dialogue system is capable of detecting such a contact.

In a further embodiment of the invention, the operator can advantageously interact with a control key, which is assigned according to the invention, according to the following. In response to a first request operation performed by the operator, a description of the primary parameter is displayed. For example, when the primary parameter is a navigation destination, the displayed output may be a short description of the navigation destination in text mode, such as "office." In response to a second request operation of the operator, a description of the secondary parameter is displayed. Display of the secondary parameter preferably occurs in conjunction with an expanded description of the primary parameter. For example, to this end the output may be again the short description, for instance, "office." In addition, the exact address can be output as the expanded description. In addition, the assigned scale of the map view is displayed as the secondary parameter.

In one exemplary embodiment, touching the control key can be defined as the first request operation and maintaining the contact over the control key for a defined period of time, for example two 2 seconds, can be defined as the second request operation.

Preferably, functions of the predefined set of functions, which can be assigned to the control key, are organized in a hierarchical menu structure and can be triggered by selection via a multi-functional operating element. The multi-functional operating element can be designed as a rotary/pressure actuator.

In one embodiment, the primary parameter is assigned by depressing the control key for a long period of time or by means of another assignment operation during the execution of the function. The secondary parameter is assigned by automatically determining the respective secondary parameter that is to be stored and is also assigned to the control key during assignment of the primary parameter to the control key.

For example, the control key can be assigned a navigation destination and the map scale that is suitable for this navigation destination in the following way. First, the operator initiates a route guidance to the navigation destination independent of the control key, for instance, by using a rotary/push button or another multi-functional input device. Prior to or thereafter, the operator selects a suitable map scale for the screen view. Once the scale has been set as desired, the operator can assign the navigation destination to the control key by pressing the control key for an extended period of time. In the course of the assignment, the currently selected map scale is determined by the dialogue system and assigned to the control key as the secondary parameter.

The assignment of other primary parameters and secondary parameters can be executed in a comparable manner. In the case of a control key being assigned a primary parameter during the execution of a function, in addition to assigning a control key the primary parameter, on the basis of which the function is currently being executed, at least one secondary parameter, which determines the method for executing the function, and/or its current value is read out and assigned to the control key to be assigned. In this way, the control key is assigned a plurality of parameters (e.g., primary parameters and secondary parameters) by means of a single assignment operation (for example, pressing the control key for an extended period). If desired, the assignment can also relate simultaneously to a plurality of secondary parameters, for example, map scale and map orientation.

According to the invention, it can also be advantageous to selectively offer the operator the possibility of assigning the primary parameter to the control key without simultaneously assigning a secondary parameter to the control key. For example, the exclusive assignment of the primary parameter can be made possible by executing an assignment operation (for example, longer press) at a point in time, at which the primary parameter is highlighted in a menu view, but still before the function with the primary parameter has been started. If a control key is assigned only one primary parameter, but no secondary parameter, then the respective function can be executed when the control key is actuated as in the conventional dialogue systems conforming to their genre, in the manner that was last set and/or in a manner that is preset by the system.

As an alternative to the above described readout of the secondary parameter during the function execution, the operator can inquire in an interactive mode in the course of assigning the control key whether he wants to assign a secondary parameter to the control key and, in that case, which secondary parameter and/or which value of the same. This interactive method can be applied both during and separately form a function execution.

DETAILED DESCRIPTION OF THE DRAWINGS

Preferably a logic system is deposited in the dialogue system. This logic system specifies in which cases not only a primary parameter but also a secondary parameter must be assigned to a control key. For example, such a logic system can have the effect that a control key is assigned one or more secondary parameters, for example, map scale and/or map orientation, only if the assigned primary parameter is a navigation destination. All other types of primary parameters are not assigned any secondary parameters on deposition of such a logic system.

Figure 1:
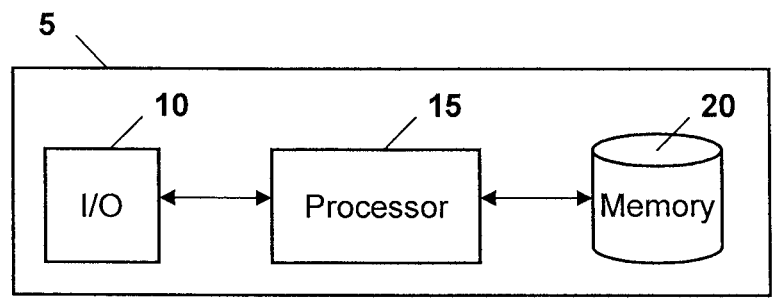
FIG. 1 depicts a simplified block diagram of a dialogue system according to one embodiment.

FIG. 1 depicts a simplified diagram of a dialogue system according to one embodiment. Dialogue system 5 includes input/output interface (I/O) 10 which can include one or more control keys. For example, the one or more control keys of dialogue system 5 may relate to a multifunction operating element, such as rotary or pressure actuator. In one embodiment, I/O 10 may be configured to receive data from a navigation system or location finding system, such as absolute position data of the motor vehicle. I/O 10 may further be configured display of text and/or output data for display.

Processor 15 of dialogue system 5 is coupled to I/O 10 and memory 20. Processor 15 may be configured to perform one or more functions as described herein, including assigning functions to control keys. Processor 15 may execute one or more functions for a primary parameter and at least one secondary parameter based on user activation of a control key.

Memory 20 relates to one of a RAM and ROM memories, and may be configured to store a value parameter, such as a current position or radius. Memory 20 may further store a value jointly with a pointer to master function.

Figure 2:
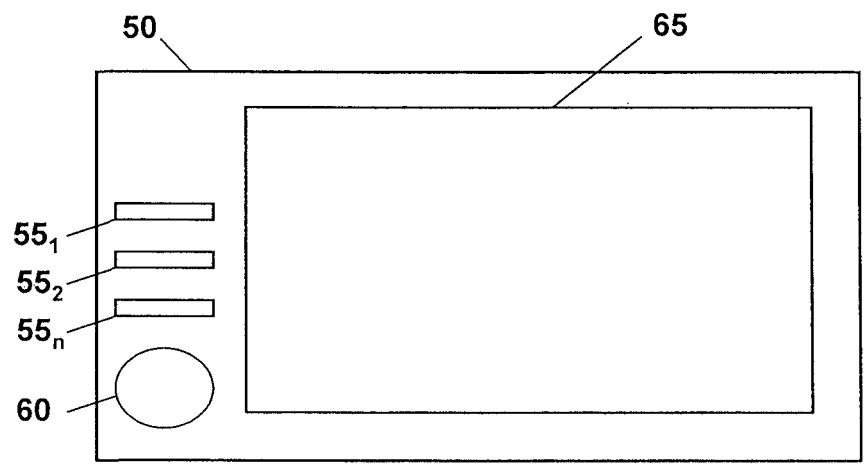
FIG. 2 depicts a graphical representation of a user interface of a dialogue system according to one embodiment.

FIG. 2 depicts a graphical representation of user interface of a dialogue system according to one embodiment. Dialogue system user interface 50 including one or more control keys $55_{1-n}$, multifunction operating element 60, such as rotary or pressure actuator, and display screen 65.

Figure 3:
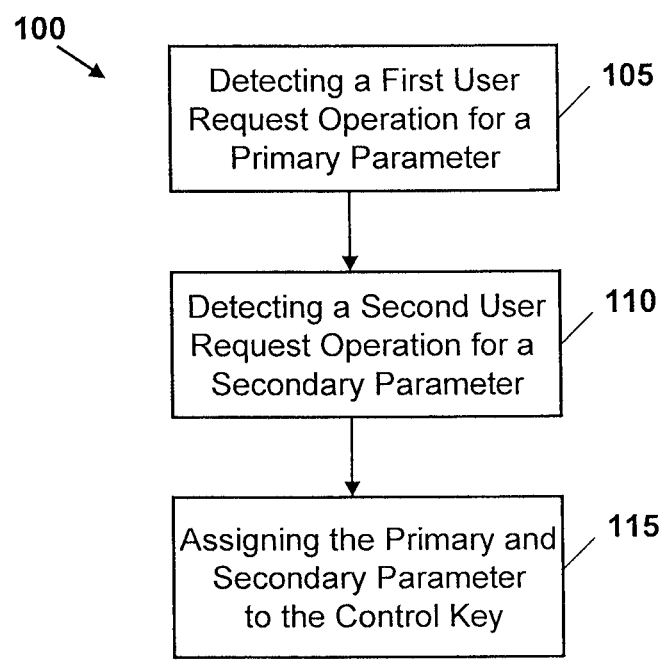
FIG. 3 depicts a process performed by the dialogue system according to one embodiment.

FIG. 3 depicts a process for assigning a primary parameter and at least one secondary parameter to control key of a dialogue system. Process 100 is initiated by detecting a user request operation of an operator of the dialogue system, the user request operation associated with a primary parameter during the execution of a function at block 105.

At block 110, process 100 continues by detecting a secondary request operation of an operator associated with at least one secondary parameter.

At block 115, the primary parameter and the at least one secondary parameter are assigned to the control key based on the current settings of the dialogue system for executing the function.

According to one embodiment, a dialogue system in a motor vehicle comprises a plurality of favorite keys (e.g., control keys $55_{1-n}$) that can be assigned in a free and unrestricted way. These keys can be assigned, inter alia, navigation destinations.

If a list of navigation destinations highlights a navigation destination, for example, by choice using a rotary/pressure actuator, and if a favorite key is depressed for a prolonged period of time (for example, longer than 2 seconds), then this favorite key is assigned the navigation destination. In the course of this type of assignment other parameters are not stored and/or assigned to the favorite key.

If, however, the route guidance to a certain navigation destination has already been executed and during this execution a favorite key has been depressed for a prolonged period of time, then the favorite key is assigned not only the navigation destination, but also two parameters, which are set for the screen view at the time of the assignment, that is, the currently set map scale (for example, 1:10,000) and the currently set map orientation (for example, pointing north).

Even if in the interim these parameters have been set totally differently, for example, in the course of a route guidance to another destination, on actuation of the favorite key that has been assigned in this way the route guidance to the navigation destination is initiated, and, in addition, the map scale is set to the value that was set at the time of the assignment, and the map orientation is set to the value that was set at the time of the assignment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A dialogue system for a motor vehicle, the dialogue system comprising:
    a plurality of control keys, wherein at least one of the control keys can be assigned a function from a predefined set of functions in such a manner that this function is executed upon actuation of the control key, wherein the function corresponds to playing a particular radio station; and
    a processor coupled to the plurality of control keys, the processor configured to
        assign the control key a primary parameter which corresponds to the function, and wherein when the function is playing a particular radio station, the primary parameter is a radio station to be selected,
        assign at least one secondary parameter, which relates to the method for executing the function, and
        execute the function in the manner defined by the secondary parameter upon actuation of the control key.

2. The dialogue system according to claim 1, wherein the at least one secondary parameter relates to a level of sound reproduction.

3. The dialogue system according to claim 1, wherein the at least one secondary parameter relates to the viewing mode of a screen.

4. The dialogue system according to claim 1, wherein at least one additional of the plurality of control keys can be assigned an additional function from the predefined set of functions in such a manner that the additional function is executed upon actuation of the additional one of the control keys, wherein the function corresponds to navigating to a particular navigation destination, a corresponding primary parameter is an address for the particular navigation destination, and a corresponding secondary parameter relates to route planning criteria for a route guidance to the particular navigation destination.

5. The dialogue system according to claim 1, further comprising a display screen electrically coupled to the plurality of control keys and to the processor, and wherein the processor is further configured to display a current assignment of the control key on the display screen in response to a request operation of an operator.

6. The dialogue system according to claim 5, wherein the processor is further configured to display on the display screen, when the control key is assigned a primary parameter and at least one such secondary parameter,
   a description of the primary parameter is displayed in response to a first request operation of an operator, and
   a description of at least one secondary parameter is displayed in response to an additional second request operation of an operator.

7. A method for assigning a primary parameter and at least one secondary parameter to control key of a dialogue system, the method comprising the acts of:
   detecting an assignment operation of an operator during execution of a function of the dialogue system, wherein the function corresponds to playing a particular radio station;
   determining a primary parameter, wherein the function execution is based on the primary parameter, and wherein when the function is playing a particular radio station, the primary parameter is a radio station to be selected;
   assigning the primary parameter to the control key;
   determining at least one secondary parameter based, at least in part, on the current settings of the dialogue system for executing the function; and
   assigning the secondary parameter to the control key.

8. The method as recited in claim 7, further comprising:
   detecting, by the dialogue system, an operator inquiry in an interactive mode of the dialogue system following assignment of secondary parameter, and
   displaying, on a display screen of the dialogue system, output associated with one or more of a control key shall be assigned a secondary parameter, the secondary parameter shall be assigned to the control key, and the value of a specific secondary parameter to be assigned to the control key.

9. A method for assigning a primary parameter and at least one secondary parameter to a control key of a dialogue system, the method comprising the acts of:
   detecting a user request operation by an operator of the dialogue system, the user request operation associated with a primary parameter during the execution of a function, wherein the function corresponds to playing a particular radio station;
   detecting a secondary request operation by the operator, the secondary request operation associated with at least one secondary parameter, and
   assigning the primary parameter and the at least one secondary parameter to the control key based on the current settings of the dialogue system for executing the function, and wherein when the function is playing a particular radio station, the primary parameter is a radio station to be selected.

10. The method according to claim 9, wherein the at least one secondary parameter relates to a level of sound reproduction.

11. The method according to claim 9, wherein the at least one secondary parameter relates to the viewing mode of a screen.

12. The method according to claim 9, wherein the method further comprises:
   assigning an additional primary parameter and at least one additional secondary parameter to an additional control key of the dialogue system: and
   detecting an additional user request operation by the operator of the dialogue system, the additional user request operation associated with the additional primary parameter during the execution of an additional function, wherein the additional function corresponds to navigating to the particular navigation destination, the primary parameter is an address for the particular navigation destination, and the at least one secondary parameter relates to route planning criteria for a route guidance to the particular navigation destination.

13. The method according to claim 9, further comprising displaying, on a display screen of the dialogue system, a current assignment of the control key in response to a request operation of an operator.

14. The method according to claim 13, further comprising displaying on the display screen, when the control key is assigned a primary parameter and at least one such secondary parameter,
   a description of the primary parameter is displayed in response to a first request operation of an operator, and
   a description of at least one secondary parameter is displayed in response to an additional second request operation of an operator.

15. The dialogue system according to claim 1, wherein at least one additional of the plurality of control keys can be assigned an additional function from the predefined set of functions in such a manner that the additional function is executed upon actuation of the additional one of the control keys, wherein the function corresponds to placing a call to a particular telephone number.

16. The method according to claim 9, wherein the method further comprises:
   assigning an additional primary parameter and at least one additional secondary parameter to an additional control key of the dialogue system; and
   detecting an additional user request operation by the operator of the dialogue system, the additional user request operation associated with the additional primary parameter during the execution of an additional function, wherein the additional function corresponds to placing a call to a particular telephone number.

* * * * *